United States Patent
Nakamura et al.

(10) Patent No.: US 10,589,651 B2
(45) Date of Patent: Mar. 17, 2020

(54) HEADREST

(71) Applicant: NHK SPRING CO., LTD., Yokohama-shi, Kanagawa (JP)

(72) Inventors: Takeshi Nakamura, Yokohama (JP); Kenichi Katsube, Yokohama (JP); Junichi Takada, Yokohama (JP); Masamichi Kobori, Yokohama (JP)

(73) Assignee: NHK SPRING CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/111,012

(22) Filed: Aug. 23, 2018

(65) Prior Publication Data

US 2019/0061586 A1 Feb. 28, 2019

(30) Foreign Application Priority Data

Aug. 25, 2017 (JP) .................. 2017/162825

(51) Int. Cl.
*B60N 2/80* (2018.01)
*B60N 2/806* (2018.01)
*B60N 2/809* (2018.01)
*B60N 2/885* (2018.01)

(52) U.S. Cl.
CPC ............. *B60N 2/885* (2018.02); *B60N 2/806* (2018.02)

(58) Field of Classification Search
CPC ................................ B60N 2/885; B60N 2/806
USPC ......................................... 297/397, 406, 407
See application file for complete search history.

(56) References Cited

U.S. PATENT DOCUMENTS

| | | | | |
|---|---|---|---|---|
| 2,464,435 A | * | 3/1949 | Conradt ............. | B60R 11/0217 297/397 |
| 5,586,810 A | * | 12/1996 | Liu ......................... | A47C 7/38 297/406 |
| 6,123,389 A | * | 9/2000 | O'Connor .............. | A47C 7/383 297/397 |
| 6,305,749 B1 | * | 10/2001 | O'Connor .............. | A47C 7/383 297/397 |
| 6,601,804 B2 | * | 8/2003 | Bisch ..................... | A47C 7/383 297/397 X |
| 6,692,071 B2 | * | 2/2004 | Fowler ................. | B60N 2/4235 297/216.12 |
| 7,080,886 B2 | * | 7/2006 | Bauer ..................... | A47C 7/38 297/406 X |

(Continued)

FOREIGN PATENT DOCUMENTS

| | | |
|---|---|---|
| JP | 5228003 B2 | 7/2013 |
| JP | 2017-056858 A | 3/2017 |

(Continued)

*Primary Examiner* — Rodney B White
(74) *Attorney, Agent, or Firm* — Knobbe, Martens, Olson & Bear, LLP

(57) ABSTRACT

A headrest includes: a main frame, left and right side frames, and left and right rotation-coupling portions. The main frame is supported at an upper end portion of a seatback. The left and right side frames that are disposed on left and right sides of the main frame. The left and right rotation-coupling portions couple the left and right side frames to the main frame such that the left and right side frames are capable of rotating with respect to the main frame about left and right up-down-extending axes. Each rotation-coupling portion includes a boss hole, a boss, a hinge hole, and a hinge.

10 Claims, 14 Drawing Sheets

(56) References Cited

U.S. PATENT DOCUMENTS

| | | | | |
|---|---|---|---|---|
| 7,201,448 B2* | 4/2007 | Williamson | ....... | B60N 2/01508 |
| | | | | 297/407 |
| 7,631,935 B2* | 12/2009 | Chen | .................... | B60N 2/2851 |
| | | | | 297/406 X |
| 8,911,020 B2* | 12/2014 | Westerink | ................. | B60N 2/80 |
| | | | | 297/407 |
| 9,028,000 B2* | 5/2015 | Millan | ..................... | B60N 2/24 |
| | | | | 297/406 X |
| 9,393,892 B1* | 7/2016 | Millan | .................... | B60N 2/838 |
| 9,783,304 B2* | 10/2017 | Zheng | ..................... | B60N 2/809 |
| 10,239,433 B2* | 3/2019 | Dillinger | ................. | B60N 2/882 |
| 10,279,718 B2* | 5/2019 | Hayashi | .................. | A47C 7/38 |
| 10,336,230 B2* | 7/2019 | Novin | ................. | B64D 11/0642 |
| 2001/0054837 A1* | 12/2001 | O'Connor | ............... | A47C 7/383 |
| | | | | 297/397 |
| 2004/0007910 A1* | 1/2004 | Skelly | ...................... | A47C 7/38 |
| | | | | 297/406 |
| 2004/0195893 A1* | 10/2004 | Clough | .................... | A47C 7/38 |
| | | | | 297/391 |
| 2004/0217639 A1* | 11/2004 | Clough | .................... | A47C 7/38 |
| | | | | 297/391 |
| 2007/0108827 A1* | 5/2007 | Clough | .................... | A47C 7/38 |
| | | | | 297/391 |
| 2018/0257533 A1* | 9/2018 | Hayashi | ................. | B60N 2/885 |

FOREIGN PATENT DOCUMENTS

| | | | | | |
|---|---|---|---|---|---|
| KR | 2010042089 A | * | 4/2010 | ............. | B60N 2/806 |
| KR | 2018039864 A | * | 4/2018 | ............. | B60N 2/806 |

* cited by examiner

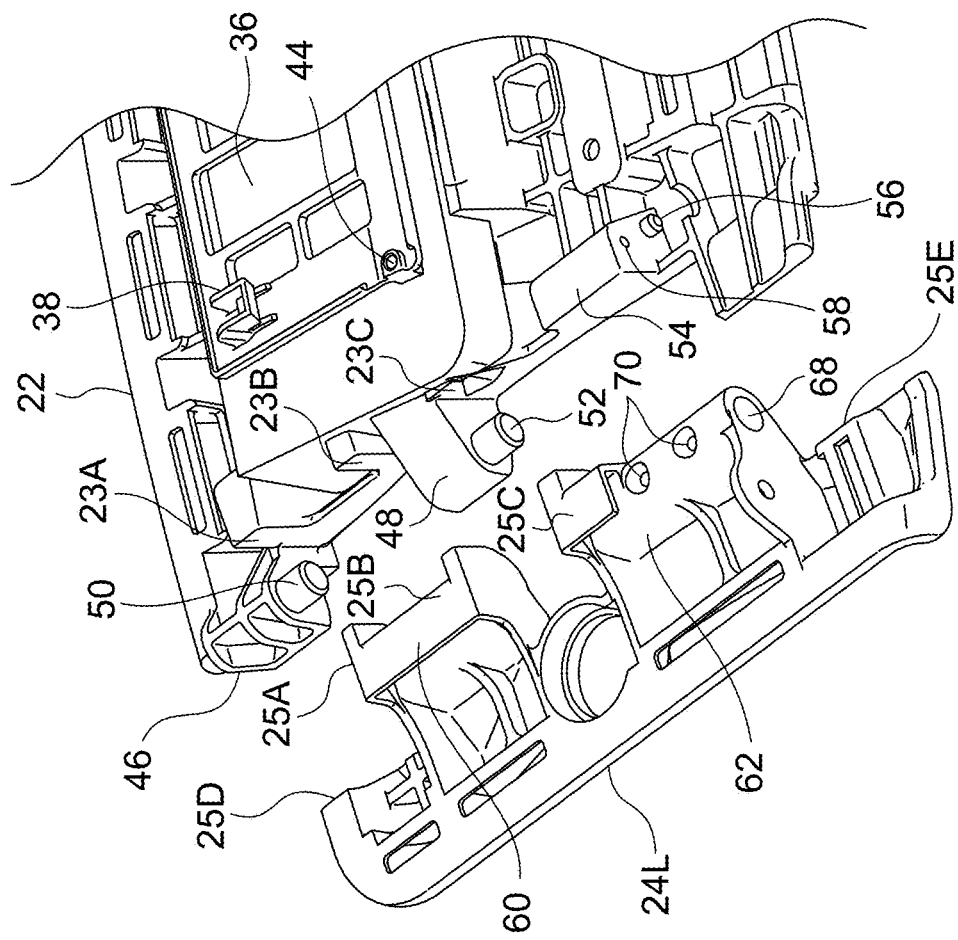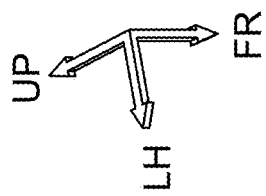

HEADREST

CROSS-REFERENCE TO RELATED APPLICATION

This application is based on and claims priority under 35 USC 119 from Japanese Patent Application No. 2017-162825 filed on Aug. 25, 2017, the disclosure of which is incorporated by reference herein.

BACKGROUND

Technical Field

The present disclosure relates to a headrest.

Related Art

Japanese Patent Application Laid-Open (JP-A) No. 2017-56858 describes a headrest that improves the comfort of a vehicle occupant. In this headrest, a front pillow section is attached in front of a rear pillow section disposed at an upper side of a seatback. Hinge brackets are fastened and fixed on both left and right sides of a main frame disposed at a left-right direction intermediate section (main section) of the front pillow section. Left and right side pipes (side frames), disposed at respective left-right direction side sections (left and right side support sections) of the front pillow section are coupled to the left and right hinge brackets through long bolts. The left and right long bolts are inserted through respective through holes formed in both upper and lower end portions of the left and right hinge brackets and the left and right side frames. A nut is screwed onto a leading end portion of each long bolt. The left and right side frames are thus coupled to the main frame so as to be capable of rotating about the left and right long bolts. This thereby enables a protrusion amount of the left and right side support sections toward the front side with respect to the main section to be adjusted.

However, in the headrest configured as described above, during assembly of the side frames to the hinge brackets of the main frame, it is necessary to dispose the upper and lower through holes in the hinge brackets coaxially to the upper and lower through holes in the side frames, and pass the long bolts through these respective through holes. This results in a complex assembly operation.

SUMMARY

In consideration of the above circumstances, an object of the present disclosure is to obtain a headrest for which the assembly of side frames to a main frame is simple.

A headrest of a first aspect of the present disclosure includes a main frame, left and right side frames, and left and right rotation-coupling portions. The main frame is supported at an upper end portion of a seatback. The left and right side frames that are disposed on left and right sides of the main frame. The left and right rotation-coupling portions couple the left and right side frames to the main frame such that the left and right side frames are capable of rotating with respect to the main frame about left and right up-down-extending axes. Each rotation-coupling portion includes a boss hole, a boss, a hinge hole, and a hinge. The boss hole is formed at one up-down direction end side of one of the main frame or a corresponding side frame. The boss is formed at one up-down direction end side of the other of the main frame or the corresponding side frame, and fits together with the boss hole so as to be capable of rotating relative to the boss hole. The hinge hole is formed at the other up-down direction end side of either one of the main frame or the corresponding side frame. The hinge includes a bracket fastened and fixed to the other up-down direction end side of the other of either the main frame or the corresponding side frame, and includes a movable shaft that is rotatably supported by the bracket and that is fitted together with the hinge hole so as to be incapable of rotating relative to the hinge hole.

In the headrest of the first aspect of the present disclosure, the left and right rotation-coupling portions couple the left and right side frames to the main frame such that the left and right side frames are capable of rotating with respect to the main frame about left and right up-down-extending axes. Each rotation-coupling portion includes the boss hole that is formed at the one up-down direction end side of one of the main frame or the corresponding side frame, the boss that is formed at the one up-down direction end side of the other of the main frame or the corresponding side frame and that fits together with the boss hole so as to be capable of rotating relative to the boss hole, the hinge hole that is formed at the other up-down direction end side of either one of the main frame or the corresponding side frame, and the hinge that includes a bracket fastened and fixed to the other up-down direction end side of the other of either the main frame or the corresponding side frame, and that includes a movable shaft that is rotatably supported by the bracket and that is fitted together with the hinge hole so as to be incapable of rotating relative to the hinge hole.

When assembling the side frame to the main frame, and boss is fitted together with the boss hole, and the movable shaft is fitted together with the hinge hole, thereby fastening and fixing the bracket to the main frame or the side frame. The side frame can accordingly be assembled to the main frame in this manner, thereby achieving a simple assembly.

A headrest of a second aspect of the present disclosure is the headrest of the first aspect, wherein the main frame and the side frames are made of resin, and the bracket and the movable shaft are made of metal.

In the headrest of the second aspect of the present disclosure, the main frame and the side frame that are made of resin are coupled together on one up-down direction end side by fitting the boss together with the boss hole, and are coupled together on the other up-down direction end side through the bracket and the movable shaft that are made of metal. This thereby enables components that are made from metal to be made smaller, enabling a reduction in weight.

A headrest of a third aspect of the present disclosure is the headrest of the first aspect, wherein the main frame and the side frames include respective contact faces that contact each other to limit a rotation range of the side frames with respect to the main frame.

In the headrest of the third aspect of the present disclosure, the contact face formed to the main frame contacts the contact face formed to the corresponding side frame, thereby limiting a rotation range of the side frame with respect to the main frame. There is accordingly no need to provide a hinge with a configuration to limit the rotation range, thereby enabling the hinge configuration to be simplified.

A headrest of a fourth aspect of the present disclosure is the headrest of the first aspect, wherein each of the rotation-coupling portions includes a central boss hole and a central boss. The central boss hole is formed at an up-down direction central side of one of the main frame or the corresponding side frame. The central boss is formed at an up-down direction central side of the other of the main frame or the corresponding side frame, and is fitted together with the central boss hole so as to be capable of rotating relative to the central boss hole.

In the headrest of the fourth aspect of the present disclosure, the main frame and the side frames are coupled together by fitting the boss together with the boss hole on one up-down direction end side, are coupled together by fitting the central boss together with the central boss hole on an up-down direction central side, and are coupled together through the hinge on the other up-down direction end side. The addition of the central boss and the central boss hole enables the coupling strength between the main frame and the side frames to be improved.

A headrest of the fifth aspect of the present disclosure is the headrest of the first aspect, wherein the hinge includes a spring that is provided between the bracket and the movable shaft, and that applies a force to resist rotation of the movable shaft with respect to the bracket.

In the headrest of the fifth aspect of the present disclosure, the spring of the hinge applies a force to resist rotation of the movable shaft with respect to the bracket. This thereby enables unintended rotation of the side frame with respect to the main frame to be prevented or suppressed by a simple configuration. Moreover, prior to assembly of the side frames to the main frame, the hinges that include the springs can be pre-assembled into a unit, enabling a simple assembly operation to be secured.

A headrest of a sixth aspect of the present disclosure is the headrest of the first aspect, wherein the bracket is formed with a positioning hole into which a positioning protrusion projecting from the other of either the main frame or the corresponding side frame is fitted, and the bracket is formed with a threaded member insertion hole into which a threaded member that is screwed into a threaded hole formed in the other of either the main frame or the corresponding side frame is inserted.

In the headrest of the sixth aspect of the present disclosure, the bracket is fastened and fixed to the other of either the main frame or the corresponding side frame (the one which is not formed with the hinge hole). When this is performed, the positioning protrusion projecting from the other of either the main frame or the corresponding side frame is fitted together with the positioning hole formed in the bracket. The threaded member (for example a screw) is inserted through the threaded member insertion hole formed in the bracket, and the threaded member is screwed into the threaded hole formed in the other of the main frame or the side frame. Accordingly, unintended rotation of the bracket with respect to the other of the either main frame or the side frame about the threaded member can be prevented, even when the bracket has a configuration that is fastened and fixed to the other of the main frame or the side frame by a single threaded member, thereby enabling an operation to fasten and fix the bracket to the other of either the main frame or the side frame to be simplified.

As described above, in the headrest according to the present disclosure, the side frames are simply assembled to the main frame.

BRIEF DESCRIPTION OF THE DRAWINGS

Exemplary embodiments of the present invention will be described in detail based on the following figures, wherein:

FIG. 12 is an exploded perspective view from a different direction to FIG. 11, illustrating part of the configuration illustrated in FIG. 11;

DETAILED DESCRIPTION

Figure 1:
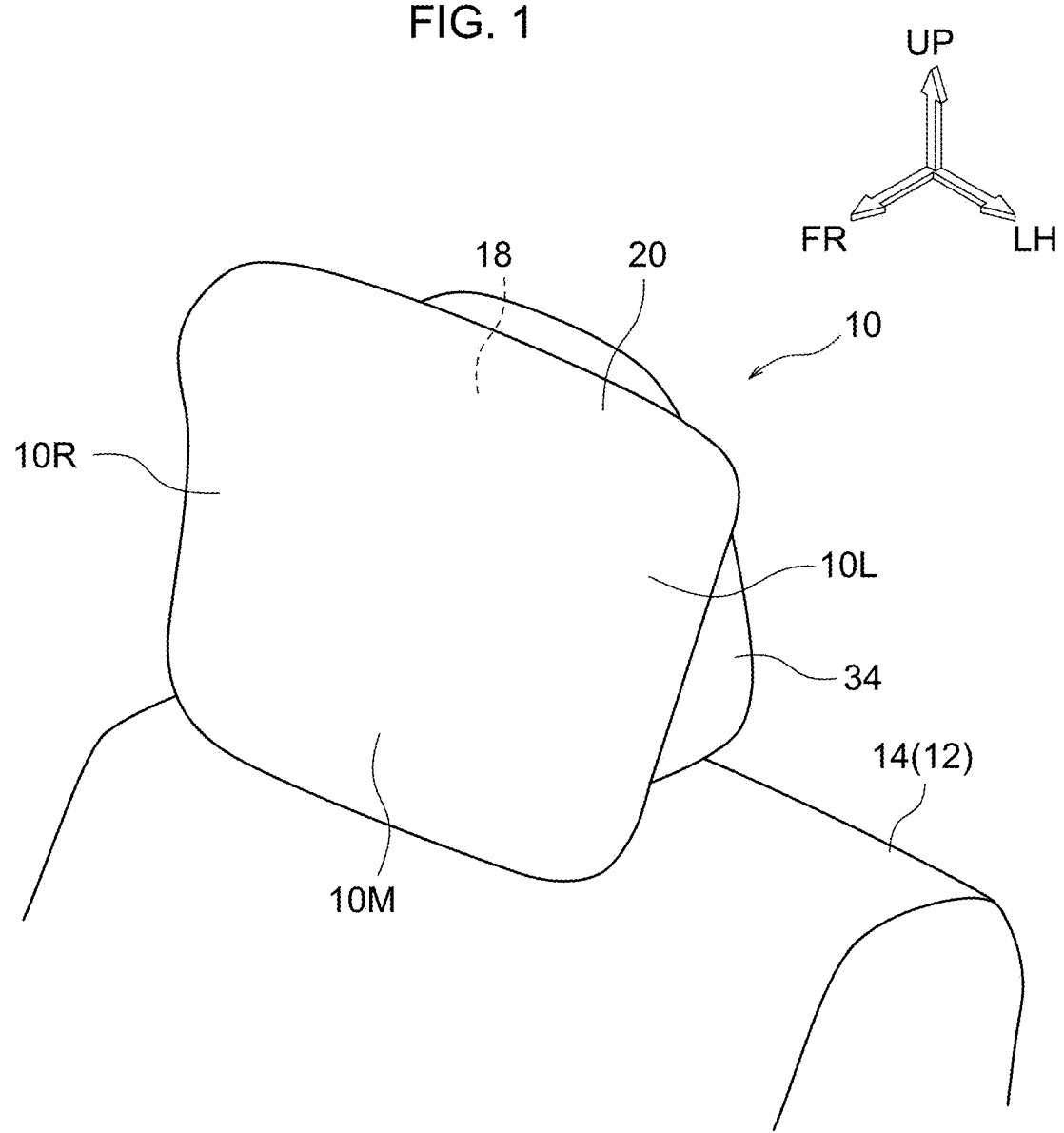
FIG. 1 is a perspective view illustrating configuration around and including a headrest according to an exemplary embodiment of the present disclosure.

Explanation follows regarding a headrest 10 according to an exemplary embodiment of the present disclosure, with reference to FIG. 1 to FIG. 21. Note that in the drawings, the arrow FR, the arrow UP, and the arrow LH respectively indicate the front, upper side, and left of the headrest 10 as appropriate. In the following explanation, unless specifically stated otherwise, reference simply to front, rear, left, right, upward, and downward directions refers to these directions of the headrest 10. In the drawings, some reference numerals may be omitted in order to make the illustration easier to comprehend.

Configuration

Figure 2:
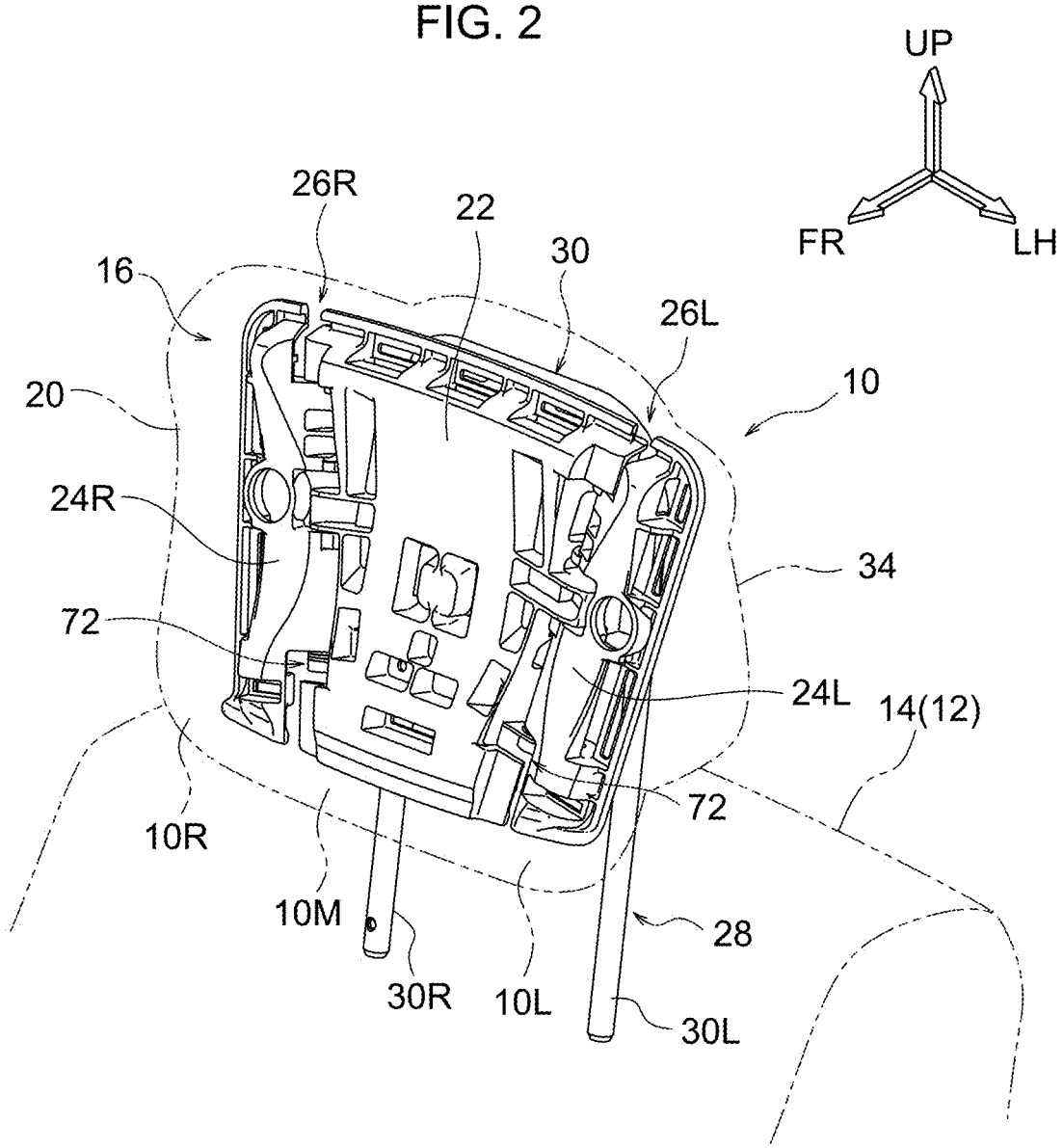
FIG. 2 is a perspective view illustrating a frame assembly of the headrest.

The headrest 10 according to the present exemplary embodiment is a headrest for a vehicle, and as illustrated in FIG. 1 and FIG. 2, is attached to an upper end portion of a seatback 14 of a vehicle seat 12. A left-right direction central portion of the headrest 10 configures a main section 10M, and the two left-right direction side sections of the headrest 10 configure respective side support sections 10L, 10R. The headrest 10 is configured including a frame assembly 16, this being a framework member, a pad 18 (see FIG. 19 to FIG. 21) attached to the frame assembly 16, and a covering 20 (see FIG. 19 to FIG. 21) that covers the surface of the pad 18. Note that the front, rear, left, right, upward, and downward directions of the headrest 10 correspond to the front, rear, left, right, upward, and downward directions of the vehicle seat 12 when the seatback 14 of the vehicle seat 12 is in an upright state (a non-reclined state).

As illustrated in FIG. 2 to FIG. 13, the frame assembly 16 includes a main frame 22 disposed at the main section 10M, left and right side frames 24L, 24R disposed at the left and right side support sections 10L, 10R, and left and right rotation-coupling portions 26L, 26R that couple the left and right side frames 24L, 24R to the main frame 22 so as to be capable of rotating about a up-down axis. Note that in the following explanation, the left and right side frames 24L, 24R are sometimes referred to as "side frames 24", and the left and right rotation-coupling portions 26L, 26R are sometimes referred to as "rotation-coupling portions 26".

The frame assembly 16 includes a leg frame 28 to support the main frame 22 at an upper end portion of the seatback 14. The leg frame 28 includes a pipe frame 30 and an attachment bracket 32.

The pipe frame 30 is, for example, manufactured by bending a metal pipe, and the attachment bracket 32 is, for example, manufactured by pressing a metal plate. The pipe frame 30 is configured substantially in an inverted U-shape as viewed along the front-rear direction of the headrest 10, and includes left and right legs 30L, 30R extending along the up-down direction of the headrest 10. The left and right legs 30L, 30R are coupled to an upper end portion of a seatback frame, not illustrated in the drawings, that is provided to the seatback 14. The attachment bracket 32 is disposed at the side of an upper portion of the pipe frame 30 and is oriented such that the plate thickness direction thereof runs in the front-rear direction of the headrest 10. The attachment bracket 32 is fixed to the upper portion of the pipe frame 30 by a method such as welding. The main frame 22 is disposed in front of the attachment bracket 32. Note that an upper portion of the leg frame 28 that includes the attachment bracket 32 is covered by a cover 34, illustrated in FIG. 1 and FIG. 2.

The main frame 22 is manufactured by resin injection molding, and is formed in an elongated plate shape overall. The main frame 22 is disposed with its length direction in the up-down direction and with its plate thickness direction in the front-rear direction, and the main frame 22 is configured substantially in an inverted trapezoid shape as viewed along the front-rear direction. As illustrated in FIG. 4, FIG. 5, and FIG. 7 to FIG. 12, a back face (reverse face) of the main frame 22 is formed with plural reinforcement ribs (not allocated reference numerals). An attachment portion 36 is formed projecting toward the rear side from a substantially central portion of the back face of the main frame 22. The attachment portion 36 is configured with a substantially rectangular shape as viewed along the front-rear direction, and is superimposed on a front face of the attachment bracket 32 described above.

Left and right pairs of hooks 38 are formed projecting toward the rear at the side of an upper portion of the attachment portion 36. The hooks 38 are inserted into a pair of left and right openings 40 formed at the side of an upper portion of the attachment bracket 32, and hook onto edges of the respective openings 40. A lower end portion of the attachment bracket 32 is formed with a pair of left and right screw holes (not illustrated in the drawings). The screws 42 (see FIG. 3 and FIG. 7) are inserted into the respective screw holes. The screws 42 are screwed into a pair of left and right threaded holes 44 formed in a lower end portion of the attachment portion 36. The main frame 22 is thus fixed to the attachment bracket 32, namely to the leg frame 28, such that the main frame 22 is supported by the upper end portion of the seatback 14 via the leg frame 28.

As illustrated in FIG. 9 to FIG. 13, a pair of upper and lower projections 46, 48 are formed projecting toward the left-right direction outsides at both a left end portion and a right end portion of the main frame 22. The upper projections 46 are formed at an upper end portion of the main frame 22, and the lower projections 48 are formed in the vicinity of an up-down direction central portion of the main frame 22. As illustrated in FIG. 10 to FIG. 13, a lower face of each upper projection 46 is formed with a circular column shaped boss 50 projecting toward the lower side, and a lower face of each lower projection 48 is formed with a circular column shaped central boss 52 projecting toward the lower side. Each boss 50 is formed at an upper end side of the main frame 22 (one up-down direction end side), and each central boss 52 is formed at the side of substantially the up-down direction center of the main frame 22 in the up-down direction. Axial directions of the bosses 50 and the central bosses 52 run substantially in the up-down direction, and the bosses 50 are disposed coaxially to the central bosses 52. The bosses 50 and the central bosses 52 are configuration elements of the rotation-coupling portions 26L, 26R, and correspond to the left and right side frames 24L, 24R.

As illustrated in FIG. 9 to FIG. 12, a pair of left and right hinge fixing portions 54 are formed projecting toward the rear side at lower portions (at another up-down direction end side) on both left and right end portions of the main frame 22. A circular column shaped positioning protrusion 56 projecting toward the lower side, and a threaded hole 58, are formed at a lower face of each hinge fixing portion 54. The threaded holes 58 are disposed at the rear side of the positioning protrusions 56. The positioning protrusions 56 and the threaded holes 58 each have an axial direction running substantially in the up-down direction, and correspond to hinges 72, described later.

The left and right side frames 24L, 24R are manufactured by resin injection molding, and are formed in elongated plate shapes overall. The side frames 24L, 24R are disposed on both left and right sides of the main frame 22 with their length directions running substantially in the up-down direction. As illustrated in FIG. 4, FIG. 5, and FIG. 8 to FIG. 12, back faces (reverse faces) of the side frames 24L, 24R are each formed with plural reinforcement ribs (not allocated reference numerals). Moreover, as illustrated in FIG. 9 to FIG. 13, the up-down direction intermediate portions of the side frames 24L, 24R are each formed with a pair of upper and lower projections 60, 62 projecting toward the main frame 22. As illustrated in FIG. 11, a circular boss hole 64 opening toward the upper side is formed in an upper face of each upper projection 60, and a circular central boss hole 66 opening toward the upper side is formed in an upper face of each lower projection 62. The boss holes 64 are formed at the upper end side (one up-down direction end side) of the side frames 24L, 24R, and the central boss holes 66 are formed at the side of the up-down direction center of the side frames 24L, 24R. Axial directions of each of the boss holes 64 and the central boss holes 66 run substantially in the up-down direction, and the boss holes 64 are disposed coaxially to the central boss holes 66. The bosses 50 and the central bosses 52 are configuration elements of the rotation-coupling portions 26L, 26R, and are fitted into the boss holes 64 and the central boss holes 66 described above so as to be capable of rotating relative thereto.

Figure 10:
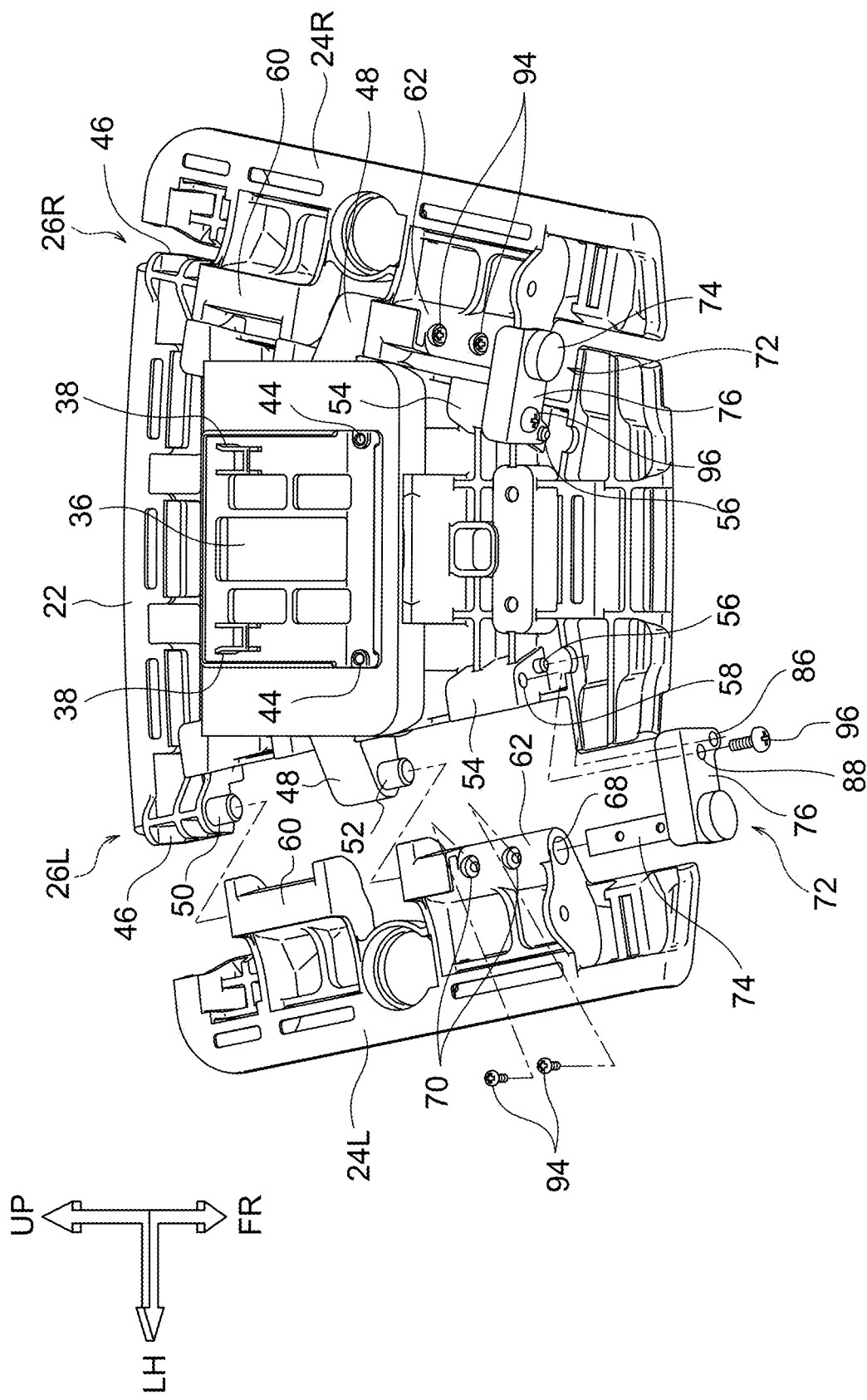
FIG. 10 is an exploded perspective view from a back face side of a frame assembly, illustrating a state in which a left side frame has been removed from a main frame of the frame assembly.
Figure 11:
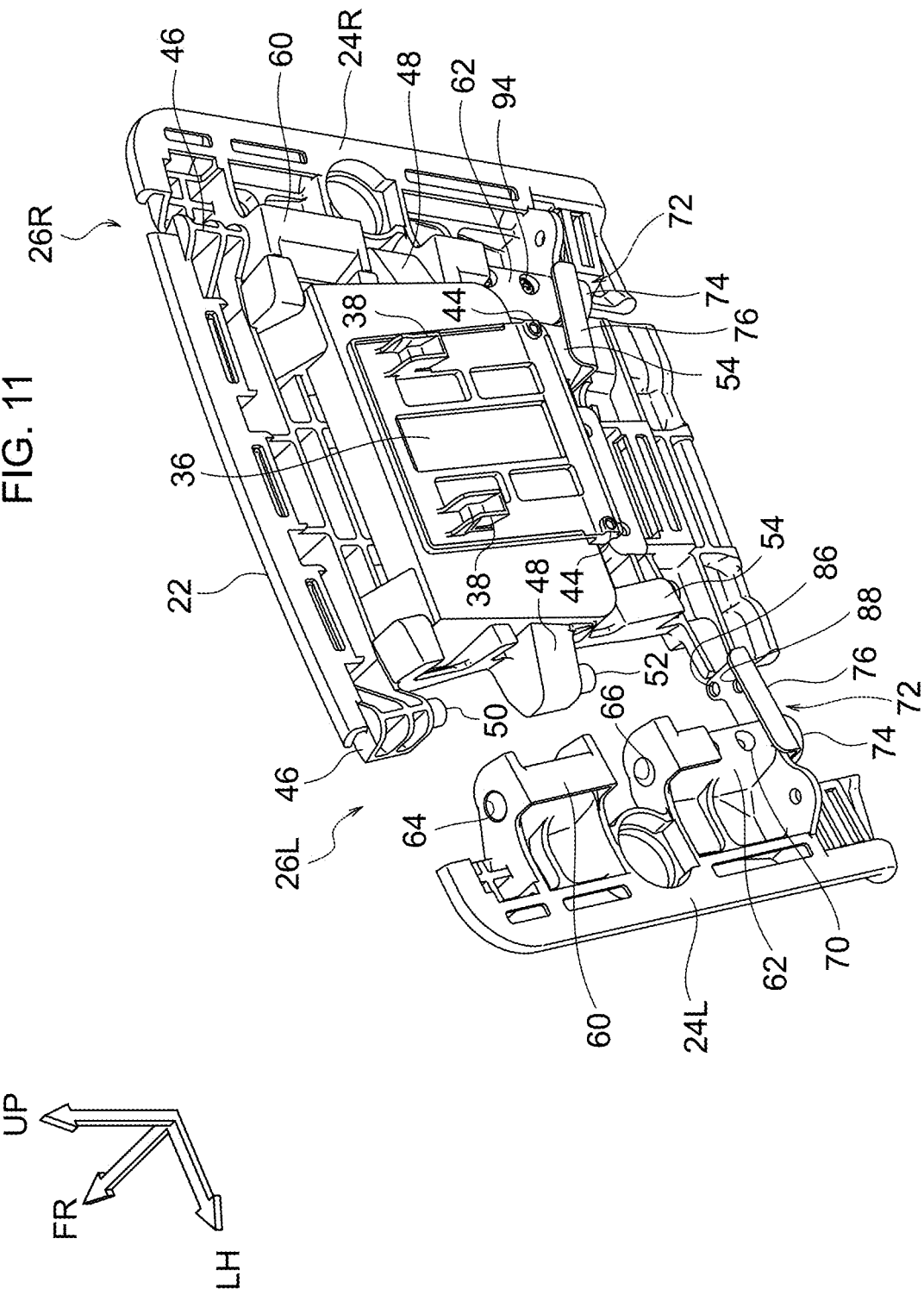
FIG. 11 is an exploded perspective view from a different direction to FIG. 10, illustrating part of the configuration illustrated in FIG. 10.
Figure 13:
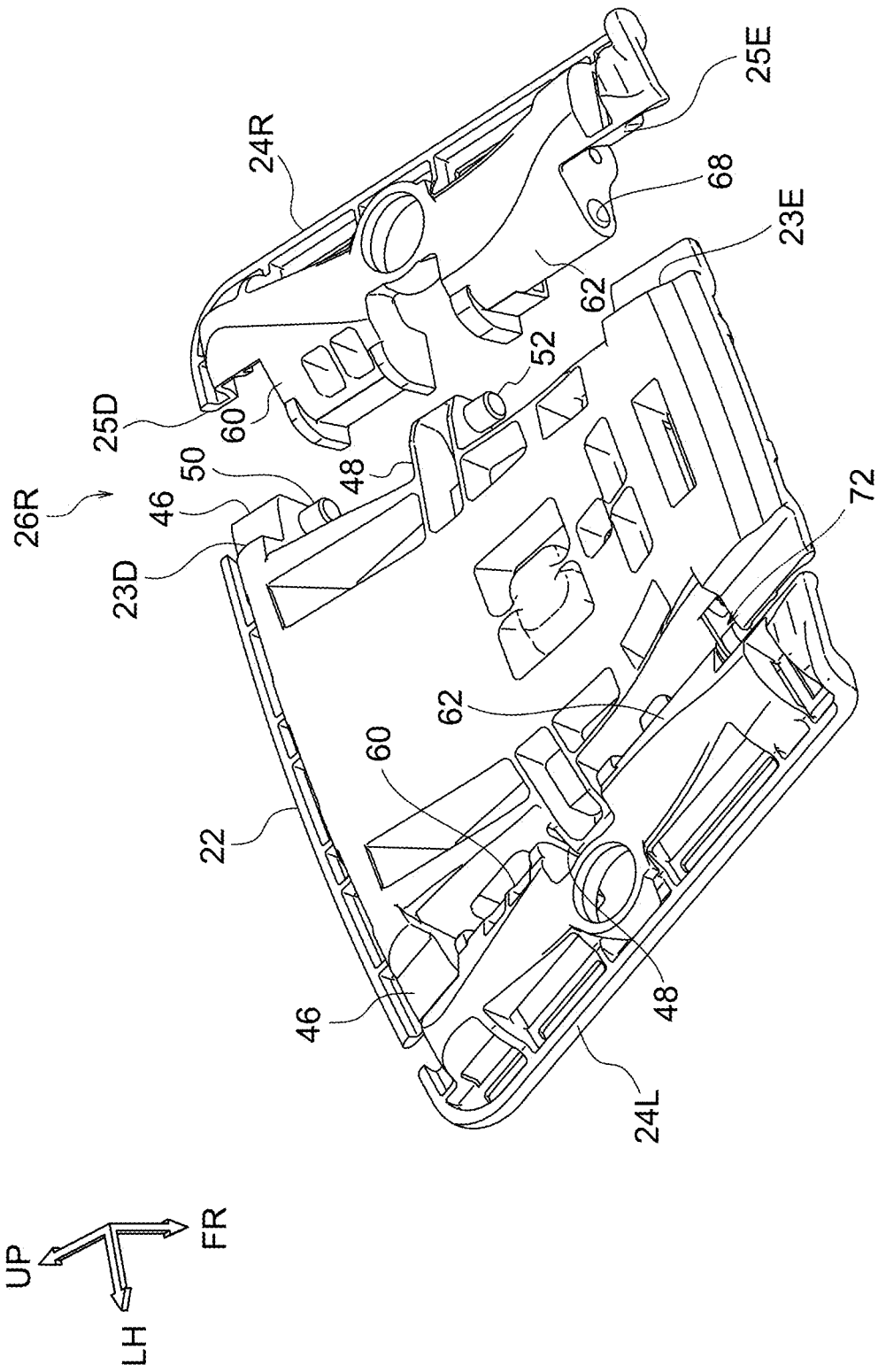
FIG. 13 is an exploded perspective view from a front face side of a frame assembly, illustrating a state in which a left side frame has been removed from a main frame of the frame assembly.
Figure 14:
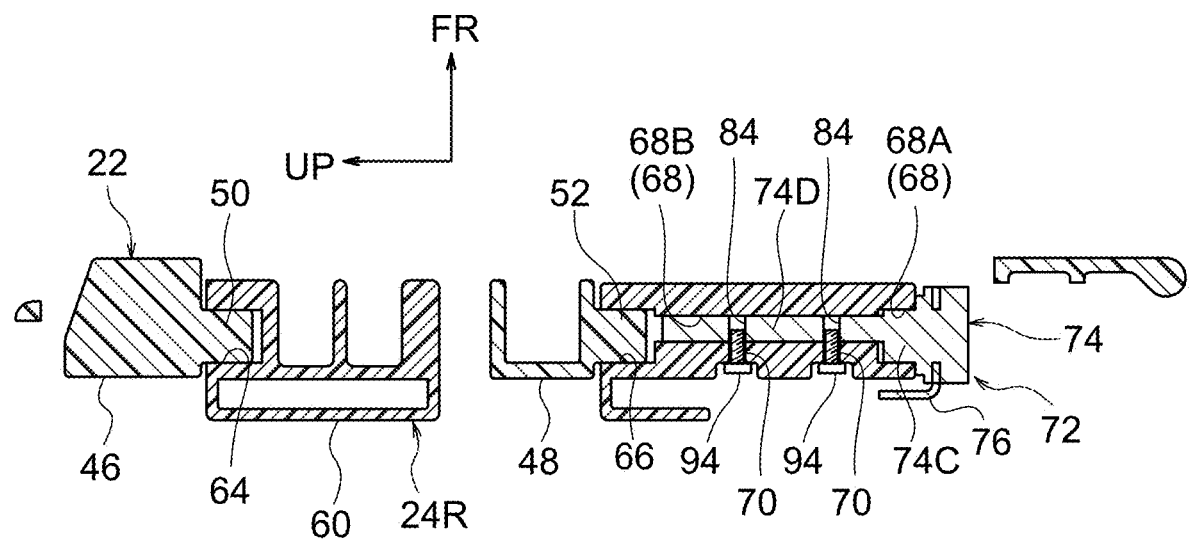
FIG. 14 is an enlarged cross-section taken along line F14-F14 in FIG. 5.

Moreover, as illustrated in FIG. 10, FIG. 12, and FIG. 13, a hinge hole 68 opening toward the lower side is formed in a lower face of each lower projection 62. The axial direction of each hinge hole 68 runs substantially in the up-down direction, and each hinge hole 68 is disposed coaxially to the respective boss hole 64 and central boss hole 66. A lower end opening 68A (see FIG. 14) of each hinge hole 68 is formed with a circular cross-section profile as viewed along the axial direction of the hinge hole 68. Moreover, the hinge hole 68 is formed with a rotation stopper 68B (see FIG. 14), at the far side (upper side) of the lower end opening 68A, that has a substantially rectangular cross-section profile (a substantially double-D cut profile) as viewed along the axial direction of the hinge hole 68. Moreover, the hinge hole 68 is linked to the corresponding central boss hole 66 described above, thereby forming a shoulder between the central boss hole 66 and the hinge hole 68.

Moreover, as illustrated in FIG. 10 to FIG. 12 and FIG. 14, each lower projection 62 is formed with a pair of upper and lower screw holes 70. The axial direction of each screw hole 70 runs in a radial direction of the hinge hole 68, and the screw holes 70 open onto back face (reverse face) of the side frames 24L, 24R. The screw holes 70 are in communication with the corresponding hinge holes 68. The screw holes 70 and the hinge holes 68 correspond to the hinges 72 illustrated in FIG. 2 to FIG. 5, FIG. 7 to FIG. 11, FIG. 13 to FIG. 16, etc.

Figure 15:
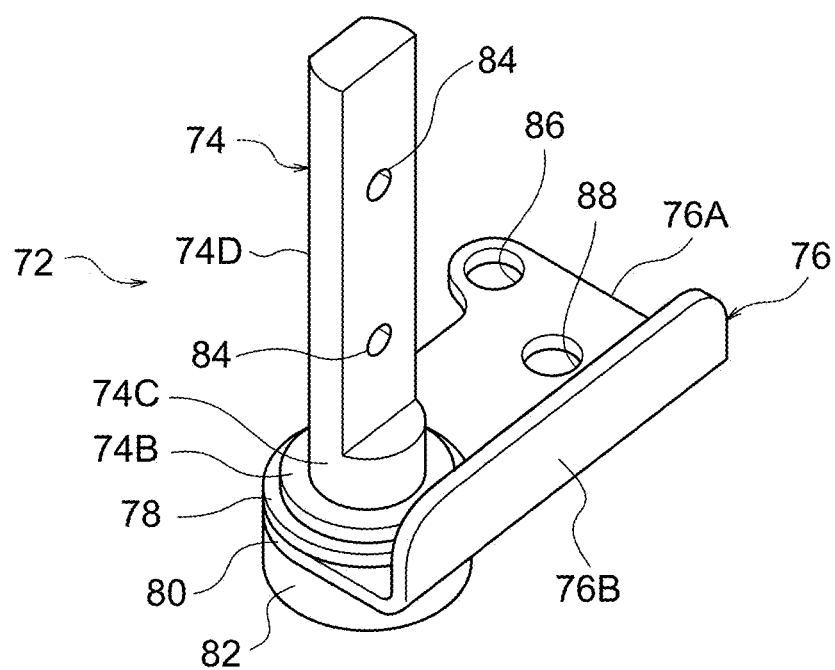
FIG. 15 is a perspective view illustrating a hinge.
Figure 16:
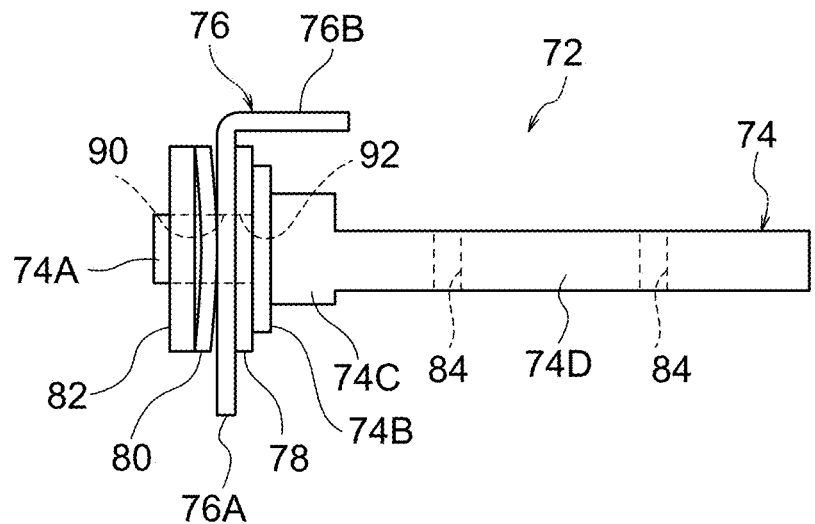
FIG. 16 is a side view illustrating a hinge.

The hinges 72 are configuration elements of the rotation-coupling portions 26, and are provided on both the left and right sides of the headrest 10. As illustrated in FIG. 15 and FIG. 16, each hinge 72 includes a movable shaft 74, a bracket 76, a friction plate 78, a spring plate (disc spring) 80, this being a spring, and a flat washer 82. Note that the hinges 72 are illustrated in simplified form in the drawings other than FIG. 15 and FIG. 16. The movable shaft 74 is formed from metal in an elongated rod shape. One length direction end portion (one axial direction end portion) of the movable shaft 74 is formed with a shaft portion 74A with a substantially rectangular cross-section profile (a substantially double-D cut cross-section profile) as viewed along the axial direction of the movable shaft 74, and also formed with a circular column shaped fitting portion 74C that has a circular column shape with a larger diameter than the shaft portion 74A. The shaft portion 74A is disposed at one end side, in the axial direction of the movable shaft 74, of the circular column shaped fitting portion 74C, and a flange 74B that has a larger diameter than the circular column shaped fitting portion 74C is formed between the shaft portion 74A and the circular column shaped fitting portion 74C.

Moreover, at the other axial direction end side of the circular column shaped fitting portion 74C, the movable shaft 74 is configured by a flat plate shaped fitting portion 74D. The flat plate shaped fitting portion 74D has an elongated substantially flat plate shape that is long in the axial direction of the movable shaft 74, and has a substantially rectangular cross-section profile (substantially double-D cut cross-section profile) as viewed along the axial direction of the movable shaft 74. A pair of threaded holes 84 are formed penetrating the flat plate shaped fitting portion 74D in its plate thickness direction. The threaded holes 84 are formed in a row in the axial direction of the movable shaft 74.

The bracket 76 is manufactured by pressing a metal plate. The bracket 76 is configured by an elongated plate shaped bracket body 76A, and a flange 76B extending from one width direction end portion of the bracket body 76A toward one plate thickness direction side of the bracket body 76A, giving the bracket 76 an L-shaped cross-section profile. One length direction end portion of the bracket body 76A is formed with a positioning hole 86 and a screw insertion hole 88.

The other length direction end portion of the bracket body 76A is formed with a circular shaft bearing hole 90 (see FIG. 16). The shaft portion 74A of the movable shaft 74 is rotatably inserted through the circular shaft bearing hole 90. The friction plate 78 is sandwiched between flange 74B of the movable shaft 74 and the bracket body 76A. The friction plate 78 is, for example, formed from metal in a circular disc shape. A through hole 92 with a substantially rectangular cross-section profile (substantially double-D cut cross-section profile) is formed through a central portion of the friction plate 78, and the shaft portion 74A fits together with the through hole 92. The friction plate 78 is thus restricted from rotating relative to the movable shaft 74.

Moreover, the spring plate 80 is provided on the opposite side of the bracket body 76A to the friction plate 78. The flat washer 82 is provided on the opposite side of the spring plate 80 to the bracket body 76A. The shaft portion 74A of the movable shaft 74 is inserted through the inside of the spring plate 80 and the flat washer 82, and a leading end portion of the shaft portion 74A is swaged (flattened). The flat washer 82 and the spring plate 80 are thus prevented from falling off the shaft portion 74A, and the movable shaft 74 is prevented from falling off the bracket 76. The movable shaft 74 is attached to the bracket 76 so as to be capable of rotating about its own axis.

The spring plate 80 is compressed between the flat washer 82 and the bracket body 76A, and biasing force from the spring plate 80 compresses the friction plate 78 between the bracket body 76A and the flange 74B. The friction plate 78 slidingly contacts (slides along) the bracket body 76A when the movable shaft 74 rotates with respect to the bracket 76. Configuration is made such that the bracket 76 is applied with a predetermined resistance force (frictional resistance) against the rotation of the movable shaft 74. Note that configuration may be made in which the friction plate 78 is omitted and the flange 74B slides directly against the bracket 76.

In the hinges 72 configured as described above, the flat plate shaped fitting portion 74D of the movable shaft 74 fits together with the rotation stopper 68B of the hinge hole 68 in each side frame 24, and the circular column shaped fitting portion 74C of the movable shaft 74 fits together with the lower end opening 68A of the hinge hole 68. Due to the flat plate shaped fitting portion 74D fitting together with the rotation stopper 68B, the movable shafts 74 are incapable of rotating relative to the side frames 24. A pair of screws 94 (see FIG. 9 and FIG. 10) that are inserted into the upper and lower screw holes 70 in the side frames 24 are screwed into the pair of threaded holes 84 in the movable shaft 74. The movable shaft 74 is thus fixed to the corresponding side frame 24L, 24R. Note that configuration may be made in which the pair of screws 94 and the pair of threaded holes 84 are omitted, namely configuration may be made in which the side frames 24 are retained simply by fitting (gently press-fitting) the movable shafts 74 into the hinge holes 68.

Figure 17:
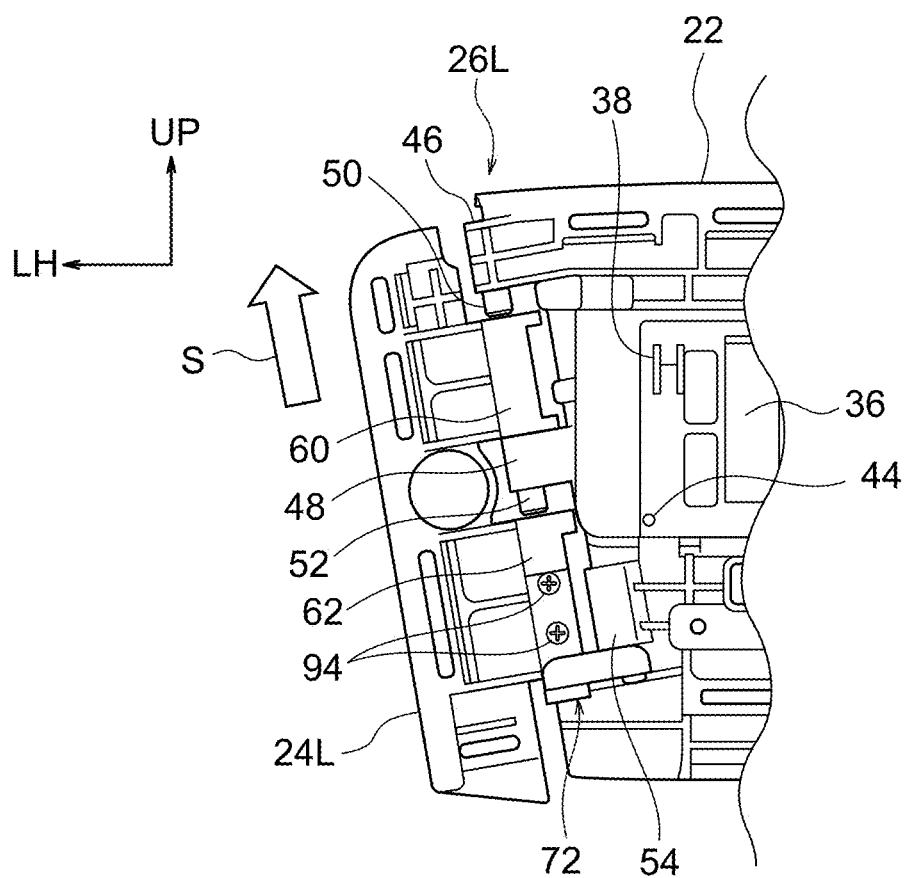
FIG. 17 is a back view to explain a method for assembling a side frame to a main frame.
Figure 18:
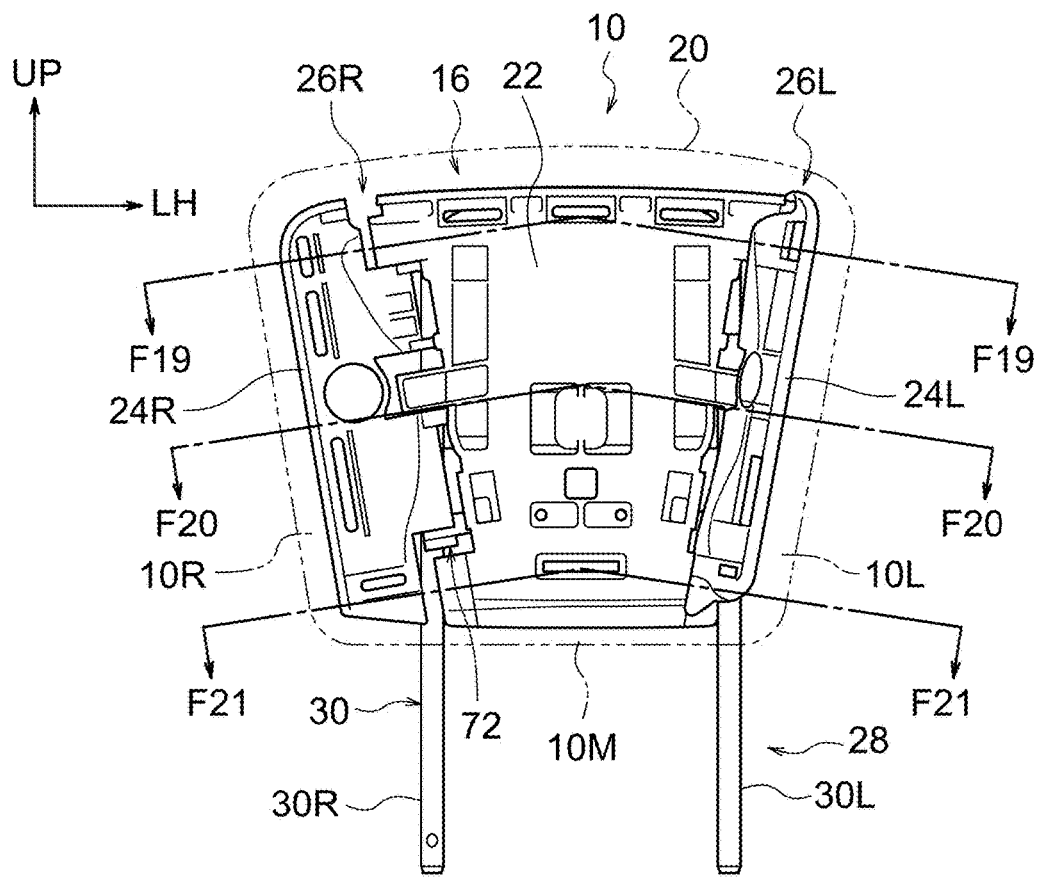
FIG. 18 is a front view illustrating a frame assembly, illustrating a state in which a left side frame is positioned at a projecting position and a right side frame is positioned at a normal position.

The side frames 24, to which the movable shaft 74 of each hinge 72 is fixed as described above, are assembled to the main frame 22 as illustrated in FIG. 17. Namely, the boss holes 64 and the central boss holes 66 of the side frames 24 are disposed below the bosses 50 and the central bosses 52 of the main frame 22, and in this state, the side frames 24 are displaced (slid) toward the upper side with respect to the main frame 22 (see the arrow S in FIG. 17). The bosses 50 and the central bosses 52 are thus fitted into the boss holes 64 and the central boss holes 66. When this is performed, the positioning protrusions 56 formed to the hinge fixing portions 54 of the main frame 22 are fitted into the positioning holes 86 formed in the brackets 76 of the hinges 72. Screws (threaded members) 96 are then inserted through the screw insertion holes 88 in the brackets 76, and the screws 96 are screwed into the threaded holes 58 in the hinge fixing portions 54. The brackets 76 are thereby fixed to the lower portion (up-down direction other end side) of the main frame 22, completing assembly of the side frames 24 to the main frame 22.

The pad 18 and the covering 20 described above are assembled to the frame assembly 16 configured as described above. The pad 18 is, for example, configured from a foamed body of urethane foam or the like. The pad 18 is split into a pad central portion 18M that is superimposed on a front face of the main frame 22, and left and right pad side portions 18L, 18R that are superimposed on front faces of the left and right side frames 24L, 24R. The covering 20 is, for example, formed by sewing plural fabric, leather, or synthetic leather covering pieces into a bag shape. The covering 20 covers the pad 18 from the front side, and is open at a rear side. Plural resin hook members (not illustrated in the drawings), for example formed with J-shaped cross-section profiles are attached to opening edges of the covering 20. The hook members hook onto the main frame 22 and to peripheral edges of the side frames 24L, 24R.

Figure 3:
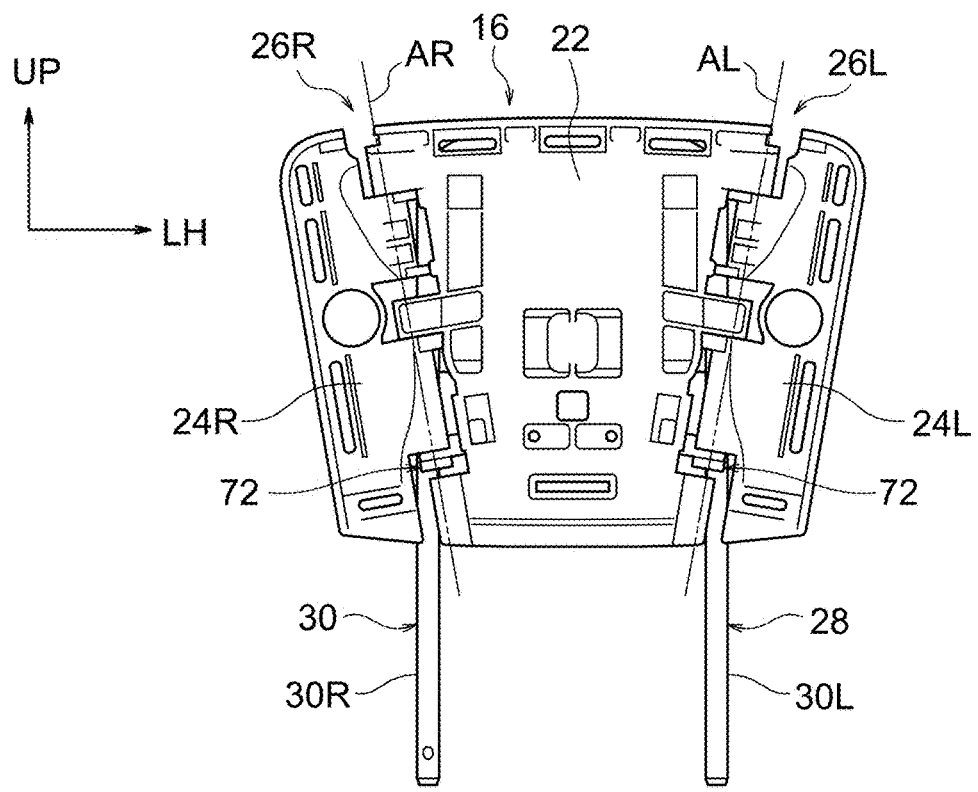
FIG. 3 is a front view of a frame assembly, illustrating a state in which left and right side frames are positioned at a normal position.
Figure 4:
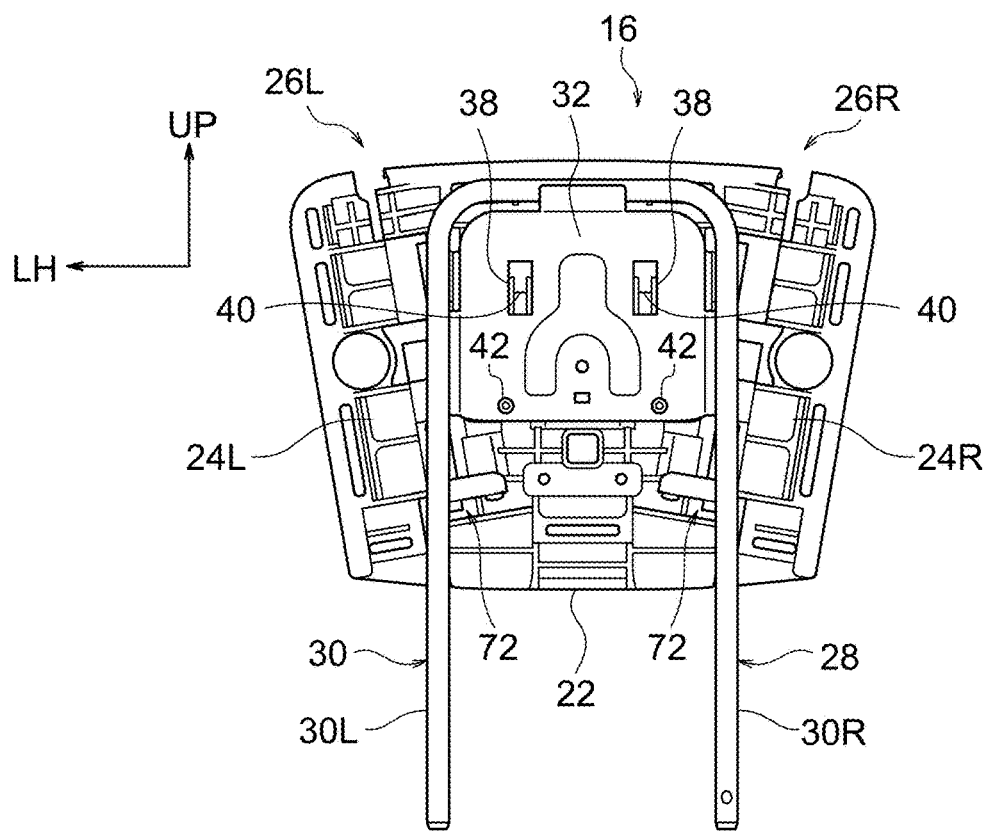
FIG. 4 is a back view of a frame assembly, illustrating a state in which left and right side frames are positioned at a normal position.
Figure 5:
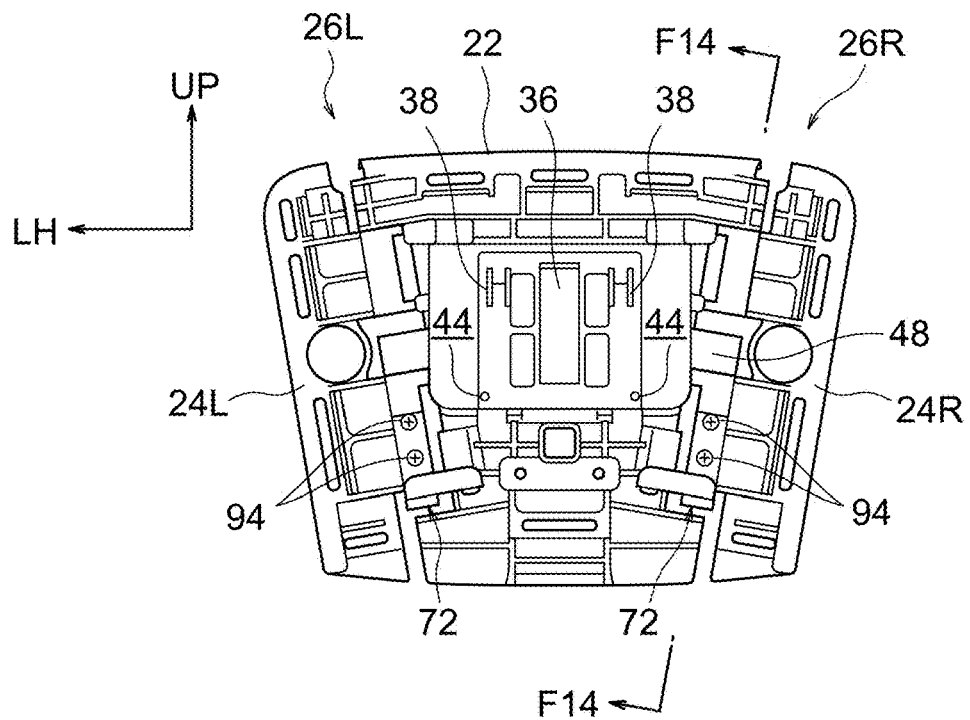
FIG. 5 is a back view illustrating relevant portions of a frame assembly, illustrating a state in which left and right side frames are positioned at a normal position.
Figure 6:
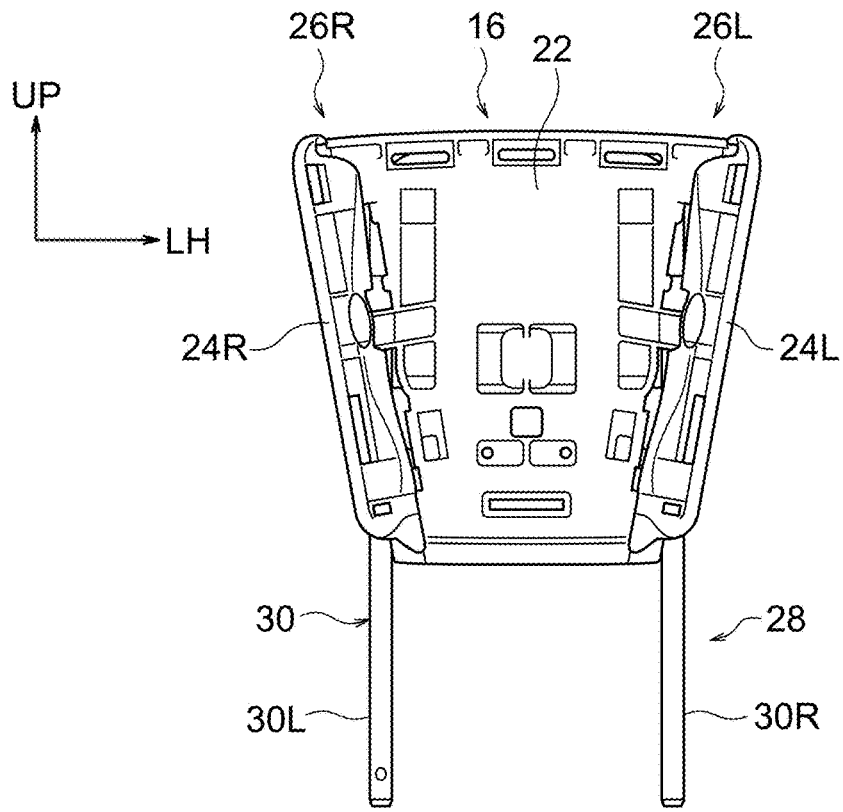
FIG. 6 is a front view of a frame assembly, illustrating a state in which left and right side frames are positioned at a projecting position.
Figure 7:
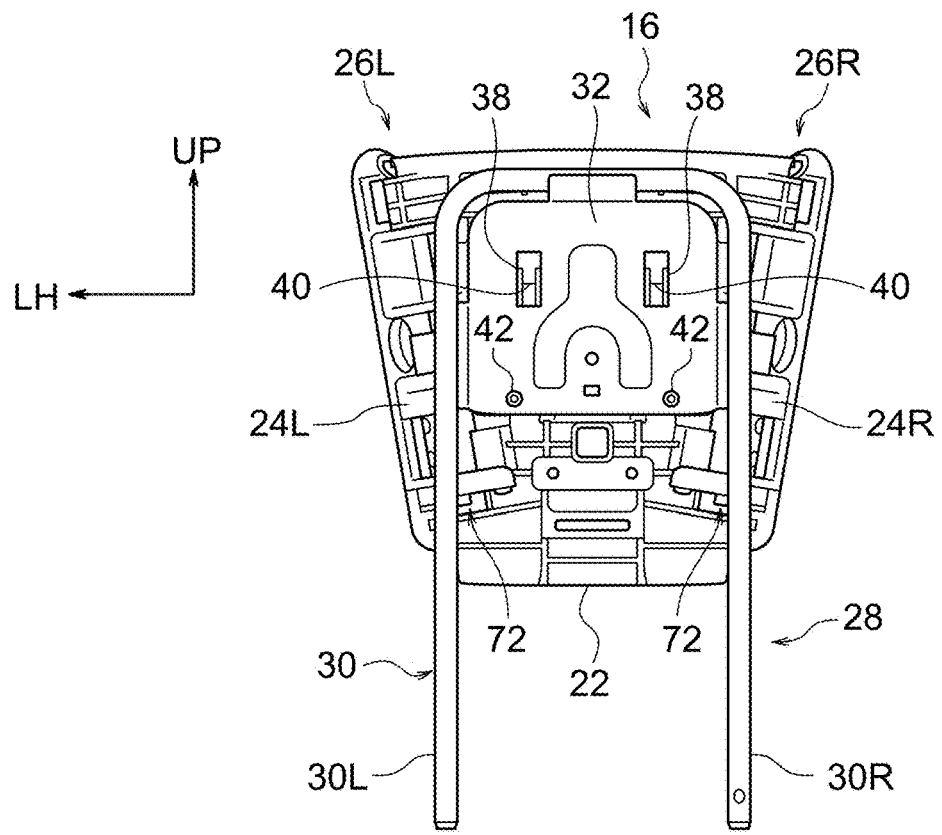
FIG. 7 is a back view of a frame assembly, illustrating a state in which left and right side frames are positioned at a projecting position.
Figure 8:
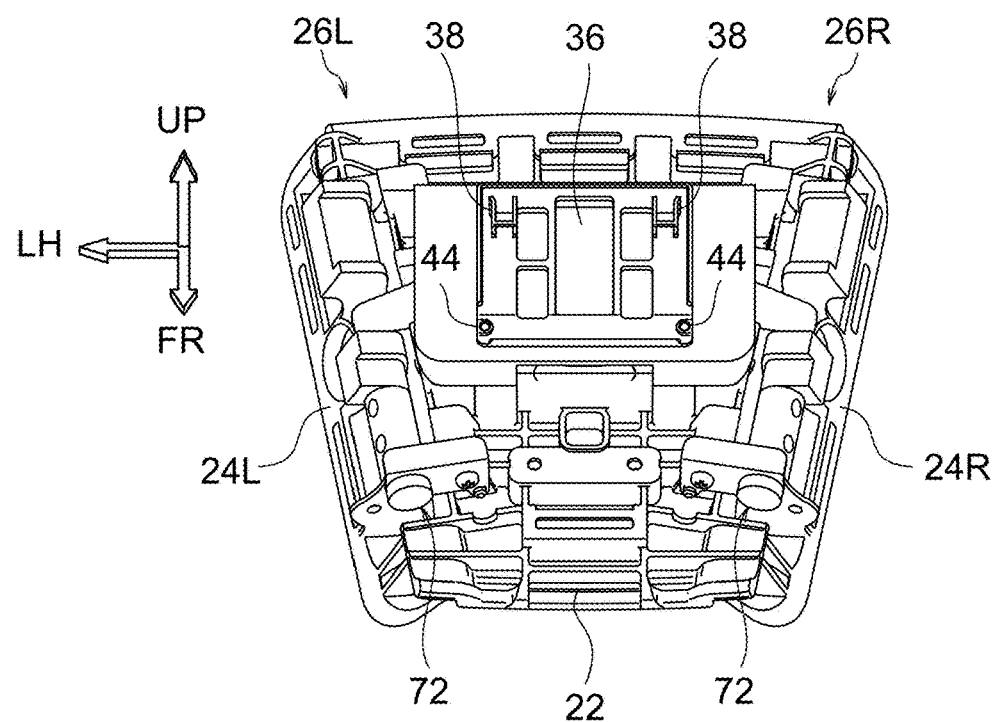
FIG. 8 is a perspective view illustrating relevant portions of a frame assembly from a back face side of the frame assembly, illustrating a state in which left and right side frames are positioned at a projecting position.
Figure 9:
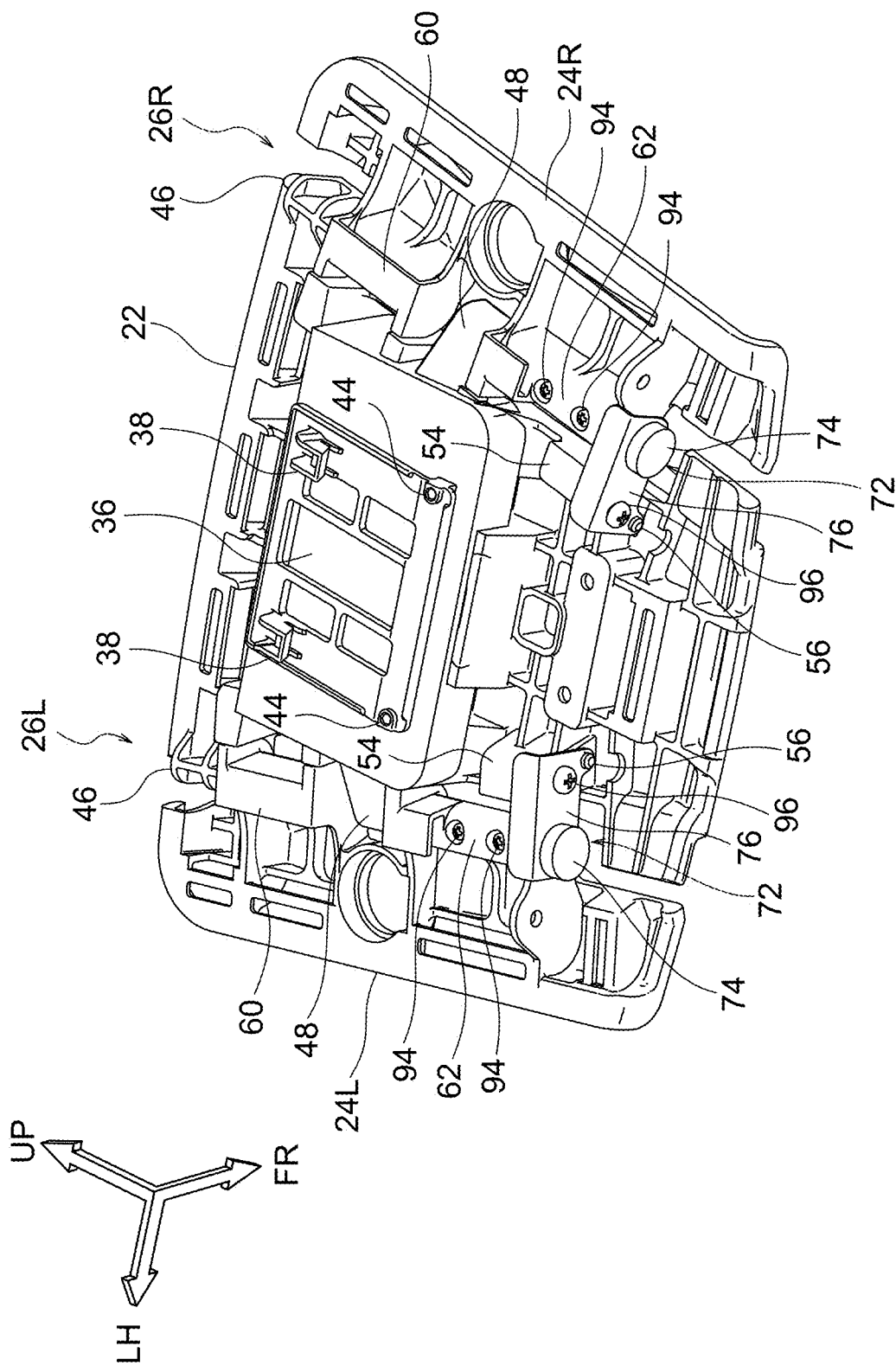
FIG. 9 is a perspective view illustrating relevant portions of a frame assembly from a back face side, illustrating a state in which left and right side frames are positioned at a normal position.

In the headrest 10, the boss 50, the boss hole 64, the central boss 52, the central boss hole 66, the hinge hole 68, and the movable shaft 74 of the rotation-coupling portion 26 on the left side are all disposed coaxially to a single axis AL (see FIG. 3). Moreover, the boss 50, the boss hole 64, the central boss 52, the central boss hole 66, the hinge hole 68, and the movable shaft 74 of the rotation-coupling portion 26 on the right side are all disposed coaxially to a single axis AR (see FIG. 3). Accordingly, the left and right side frames 24L, 24R are capable of rotating with respect to the main frame 22 about the respective axes AL, AR between a normal position, as illustrated with respect to the main frame 22 in FIG. 2 to FIG. 5, etc., and a projecting position illustrated with respect to the main frame 22 in FIG. 6 to FIG. 8, etc.

In a state in which the side frames 24 are positioned at the projecting position, contact faces 25A, 25B, 25C (see FIG. 12) formed to the upper and lower projections 60, 62 of the side frames 24 make contact with contact faces 23A, 23B, 23C (see FIG. 12) formed to the main frame 22 at locations opposing the projections 60, 62. The side frames 24 are thus restricted from rotating further toward the front side than the projecting position with respect to the main frame 22. Moreover, in a state in which the side frames 24 are positioned at the normal position, contact faces 25D, 25E (see FIG. 12 and FIG. 13), formed to upper and lower end portions of the side frames 24, make contact with contact faces 23D, 23E (see FIG. 13) formed to upper end portions and a lower end portions of the main frame 22. The side frames 24 are thus restricted from rotating further toward the rear side than the normal position with respect to the main frame 22. Namely, the main frame 22 and the side frames 24 respectively include the contact faces 25A, 25B, 25C, and contact faces 23A, 23B, 23C, and the contact faces 25D, 25E and the contact faces 23D, 23E, that respectively contact one another other to limit a rotation range of the side frames 24 with respect to the main frame 22.

Figure 19:
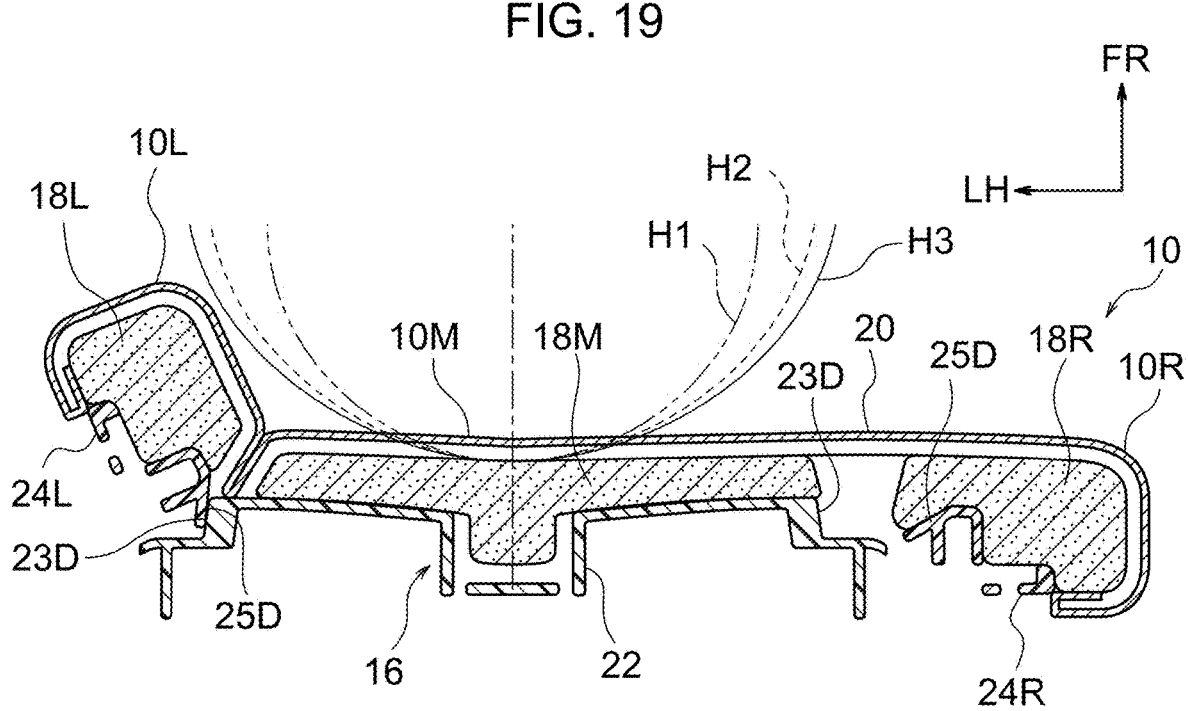
FIG. 19 is an enlarged cross-section taken along line F19-F19 in FIG. 18.
Figure 20:
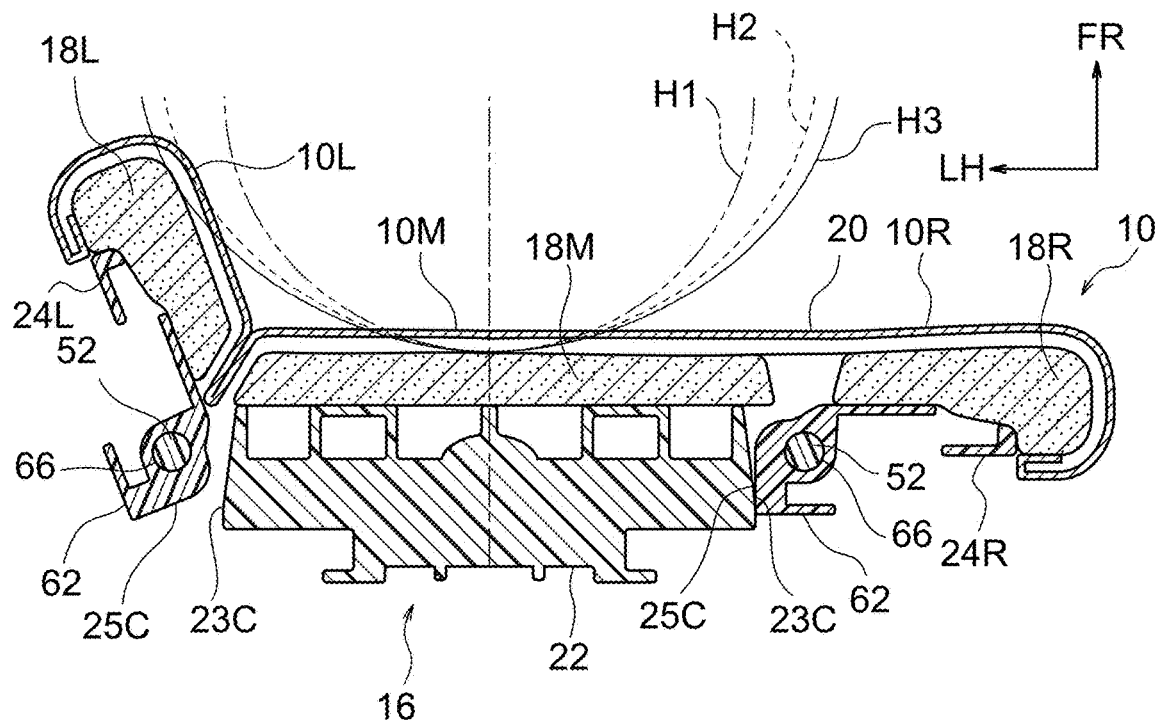
FIG. 20 is an enlarged cross-section taken along line F20-F20 in FIG. 18.
Figure 21:
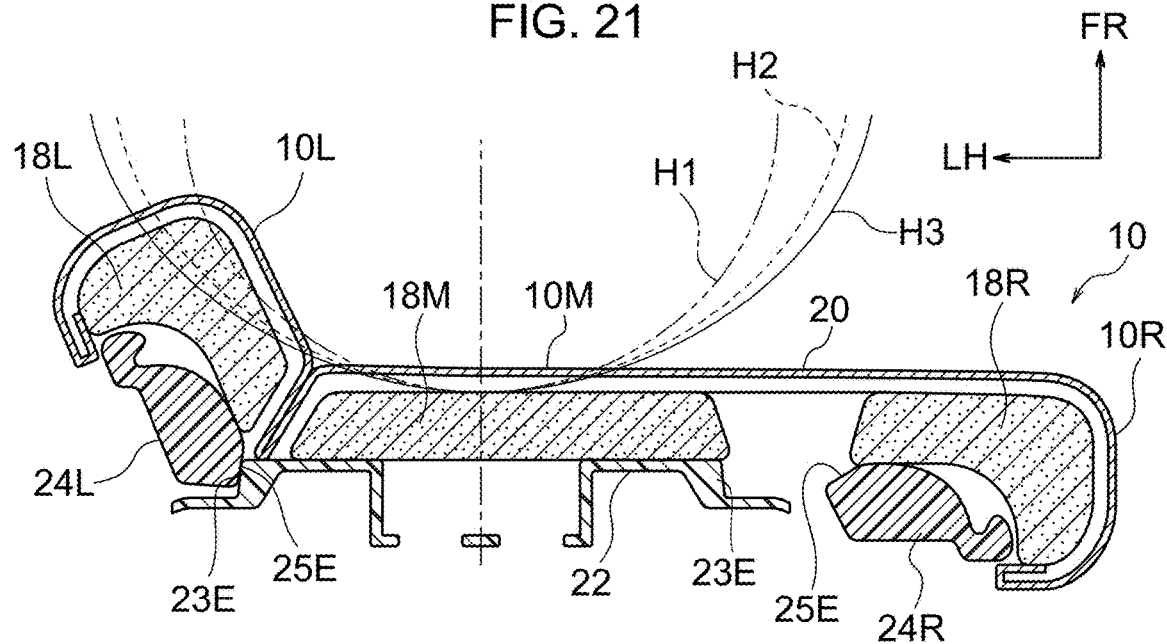
FIG. 21 is an enlarged cross-section taken along line F21-F21 in FIG. 18.

Moreover, in the headrest 10, a protrusion amount of the left and right side support sections 10L, 10R toward the front side with respect to the main section 10M of the headrest 10 can be adjusted by rotating the left and right side frames 24L, 24R described above. Specifically, when external force in the front-rear direction of a preset value or greater is applied to the left and right side support sections 10L, 10R where the left and right side frames 24L, 24R are disposed, the left and right side frames 24L, 24R rotate about the left and right axes AL, AR with respect to the main frame 22. This thereby enables the positions of the side support sections 10L, 10R to be adjusted to suit the shape of the head of a seated occupant or the like. Note that FIG. 18 to FIG. 21 illustrate states in which the left side frame 24L is positioned at the projecting position, and the right side frame 24R is positioned at the normal position. In FIG. 19 to FIG. 21, H1 indicates the head of an AF05 dummy, H2 indicates the head of an AM50 dummy, and H3 indicates the head of an AM95 dummy.

Moreover, in a state in which the external force is no longer applied, the left and right side frames 24L, 24R are held in position by frictional force arising between the friction plates 78 and the bracket bodies 76A. Note that configuration may be made in which ratchet mechanisms are disposed between the left and right side frames 24L, 24R and the main frame 22, such that the ratchet mechanisms restrict unintended rotation of the left and right side frames 24L, 24R.

Moreover, in the present exemplary embodiment, the left and right axes AL, AR (see FIG. 3) about which the left and right side frames 24L, 24R rotate are inclined toward a left-right direction central side of the headrest 10 (approach one another) on progression downward in the up-down direction of the headrest 10. Accordingly, when the left and right side support sections 10L, 10R rotate toward the front side about the left and right axes AL, AR, lower portions of the left and right side support sections 10L, 10R are displaced further toward the left-right direction central side of the headrest 10 than upper portions of the left and right side support sections 10L, 10R. The axes AL, AR are inclined so as to accommodate the different left-right direction width dimensions of the rear of the head and the neck of a seated occupant.

Operation and Advantageous Effects

Next, explanation follows regarding operation and advantageous effects of the present exemplary embodiment.

In the headrest 10 configured as described above, the left and right rotation-coupling portions 26L, 26R of the frame assembly 16 couple the left and right side frames 24L, 24R to the main frame 22 so as to be capable of rotating with respect to the main frame 22 about the up-down extending axes AL, AR. Each rotation-coupling portion 26 is provided with the hinge 72 that includes: the boss hole 64, formed at the upper end side of the corresponding side frame 24; the boss 50, formed at the upper end side of the main frame 22; the hinge hole 68, formed at the lower end side of the corresponding side frame 24; the bracket 76, fastened and fixed to the lower end side of the main frame 22; and the movable shaft 74, rotatably supported by the bracket 76.

Note that during assembly of the side frames 24 to the main frame 22, the bosses 50 are fitted together with the boss holes 64, the movable shafts 74 are fitted together with the hinge holes 68, and the brackets 76 are fastened and fixed to the main frame 22. Assembly is simple since the side frames 24 can be assembled main frame 22 in this manner.

Moreover, in the present exemplary embodiment, the number of components that have to be assembled during the above assembly task is small. This also contributes to simple assembly. Namely, in the headrest described in the Related Art section, when assembling the side frames to the hinge bracket (main frame) using long bolts, it is necessary to assemble washers and plastic bushes between the head of each long bolt and the side frames, and to assemble washers and disc springs between the side frames and the nuts. Since the number of components that have to be assembled is large, the assembly task becomes more complex. This issue is avoided in the present exemplary embodiment.

Moreover, in the present exemplary embodiment, the frame 22 and the side frames 24 made of resin are coupled together by fitting the bosses 50 and the boss holes 64 together at the upper end side, and by coupling the bracket 76 and the movable shaft 74 made of metal together at the lower end side. Accordingly, the size of metal components can be reduced, enabling a reduction in weight. Namely, in the headrest described in the Related Art section, long bolts are passed through the upper and lower through holes in the hinge bracket and the side frames. The long bolts are thus elongated, increasing the weight of the long bolts. Regarding this point, in the present exemplary embodiment, the metal movable shaft 74 does not need to extend all the way from the lower end side to the upper end side of the main frame and the side frame, such that the movable shafts 74 can be made shorter, enabling a reduction in size of the hinges 72. This enables a reduction in the weight of the headrest 10.

Moreover, in the present exemplary embodiment, the contact faces 25A, 25B, 25C formed to the upper and lower projections 60, 62 of the side frames 24 contact the contact faces 23A, 23B, 23C formed to the main frame 22 at locations opposing the projections 60, 62, thereby restricting rotation of the side frames 24 further toward the front side than the projecting position with respect to the main frame 22. Moreover, the contact faces 25D, 25E formed to both the upper and lower end portions of the side frames 24 contact the contact faces 23D, 23E formed to both the upper and lower end portions of the main frame 22, thereby restricting rotation of the side frames 24 further toward the rear side than the normal position with respect to the main frame 22. In this manner, the respective contact faces formed to the main frame 22 contact the respective contact faces formed to the side frames 24 to limit the rotation range of the side frames 24L, 24R with respect to the main frame 22. There is accordingly no need to provide the hinges 72 with a structure to limit the rotation range of the side frames 24, enabling the structure of the hinges 72 to be simplified.

Moreover, in the present exemplary embodiment, the rotation-coupling portions 26 include the central boss holes 66 formed at an up-down direction central side of the side frames 24L, 24R, and the central bosses 52 formed in an up-down direction central side of the main frame 22 and that fit together with the central boss holes 66 so as to be capable of rotating relative thereto. The addition of the central bosses 52 and the central boss holes 66 enables the coupling strength between the main frame 22 and the side frames 24L, 24R to be increased. Moreover, the up-down direction dimensions and the like of the side frames 24 can be modified according to the number, and presence or absence, of the central bosses 52 and the central boss holes 66, simplifying design. Moreover, there is no need to modify the size of the hinges 72 even if the up-down direction dimensions of the side frames 24 change, enabling common hinges 72 to be applied and thus contributing to a reduction in costs.

Moreover, in the present exemplary embodiment, the spring plate 80 of the hinge 72 applies force to resist rotation of the movable shaft 74 with respect to the bracket 76. This thereby enables unintended swinging of the side frames 24 with respect to the main frame 22 to be prevented or suppressed with a simple configuration. Moreover, prior to assembly of the side frames 24 to the main frame 22, the hinges 72 including the spring plates 80 can be pre-assembled into a unit, enabling the ease of assembly referred to above to be secured.

Moreover, in the present exemplary embodiment, the leading end portion of the shaft portion 74A of the movable shaft 74 is swaged, thereby retaining the flat washer 82 and the spring plate 80 (disc spring) to the shaft portion 74A, and the compression amounts of the spring plate 80 are able to be set uniformly by swaging. Accordingly, the resistance force, namely the operation force required to adjust the protruding positions of the side support sections 10L, 10R can be made constant. Moreover, in the present exemplary embodiment, the movable shaft 74 is fitted (press fitted) into the hinge hole 68 of the side frames 24 such that relative rotation therebetween is not possible, enabling variation in the operation force resulting from such relative rotation to be prevented. Note that in the headrest described in the Related Art section, a disc spring is compressed by the long bolt and the nut, and therefore loosening or tightening of the nut would cause the operation force to vary.

Moreover, in the present exemplary embodiment, each bracket 76 is fastened and fixed to the main frame 22. When this is performed, the positioning protrusion 56 projecting from the main frame 22 is fitted together with the positioning hole 86 formed in the bracket 76. The screw 96 is then inserted through the screw insertion hole 88 formed in the bracket 76, and the screw 96 is screwed together with the threaded hole 58 formed in the main frame 22. Unintended rotation of the bracket 76 about the screws 96 with respect to the main frame 22 can thus be prevented even in a configuration in which the bracket 76 is fastened and fixed to the main frame 22 by a single screw 96, thereby enabling an operation to fasten and fix the bracket 76 to the main frame 22 to be simplified.

Moreover, the hinges 72 according to the present exemplary embodiment function as portions to support rotation of the side frames 24 and also function as coupling members that couple the side frames 24 and the main frame 22 together, thereby achieving a simple configuration. Moreover, since the bracket 76 of each hinge 72 includes the flange 76B extending along the axial direction of the movable shaft 74, the strength of the bracket 76 with respect to load along the axial direction can be secured with a simple configuration.

Note that in the exemplary embodiment described above, the main frame 22 is formed with the bosses 50 and the central bosses 52, and the side frames 24 are formed with the boss holes 64 and the central boss holes 66. However, there is no limitation thereto. Namely, configuration may be made in which the main frame 22 is formed with the boss holes 64 and the central boss holes 66, and the side frames 24 is formed with the bosses 50 and the central bosses 52.

Moreover, the exemplary embodiment described above includes the central bosses 52 and the central boss holes 66. However, there is no limitation thereto, and the central bosses 52 and the central boss holes 66 may be omitted.

Moreover, in the exemplary embodiment described above, the brackets 76 of the hinges 72 are fastened and fixed to the main frame 22, and the hinge holes 68 are formed in the side frames 24. However, there is no limitation thereto. Namely, configuration may be made in which the brackets 76 of the hinges 72 are fastened and fixed to the side frames 24, and the hinge holes 68 are formed in the main frame 22.

Moreover, in the exemplary embodiment described above, explanation has been given regarding a case in which the headrest 10 is a headrest for a motor vehicle. However, there is no limitation thereto, and the headrest according to the present disclosure may be applied as a headrest of a seat of a vehicle other than a motor vehicle.

Various other modifications may be implemented in a range not departing from the spirit of the present disclosure. Obviously, the scope of rights of the present disclosure is not limited by the exemplary embodiment described above.

What is claimed is:

1. A headrest comprising:
    a main frame that is supported at an upper end portion of a seatback;
    left and right side frames that are disposed on left and right sides of the main frame; and
    left and right rotation-coupling portions that couple the left and right side frames to the main frame such that the left and right side frames are capable of rotating with respect to the main frame about respective axes extending in a vertical direction,
    each rotation-coupling portion including
        a boss hole that is formed at one end side in the vertical direction of either one of the main frame or a corresponding side frame,
        a boss that is formed at the one end side in the vertical direction of the other of the main frame or the corresponding side frame, and that is inserted into the boss hole so as to be capable of rotating relative to the boss hole,
        a hinge hole that is formed at the other end side in the vertical direction of either one of the main frame or the corresponding side frame, and
        a hinge that includes a bracket fastened and fixed to the other end side in the vertical direction of the other of the main frame or the corresponding side frame, and that includes a movable shaft that is rotatably supported by the bracket and that is inserted into the hinge hole so as to be incapable of rotating relative to the hinge hole.

2. The headrest of claim 1, wherein:
    the main frame and the side frames are made of resin; and
    the bracket and the movable shaft are made of metal.

3. The headrest of claim 1, wherein the main frame and the side frames include respective contact faces that contact each other to limit a rotation range of the side frames with respect to the main frame.

4. The headrest of claim 1, wherein each of the rotation-coupling portions includes:
    a central boss hole that is formed at a central part in the vertical direction of one of the main frame or the corresponding side frame; and
    a central boss that is formed at a central part in the vertical direction of the other of the main frame or the corresponding side frame, and that is inserted into the central boss hole so as to be capable of rotating relative to the central boss hole.

5. The headrest of claim 1, wherein the hinge includes a spring that is provided between the bracket and the movable shaft, and that applies a force to resist rotation of the movable shaft with respect to the bracket.

6. The headrest of claim 5, wherein the spring is a disc spring.

7. The headrest of claim 6, wherein the disc spring is retained on the movable shaft by swaging an end portion of the movable shaft, and such that the disc spring is set with a uniform compression amount by the swaging.

8. The headrest of claim 1, wherein the bracket is formed with a positioning hole into which a positioning protrusion projecting from the other of either the main frame or the corresponding side frame is inserted, and the bracket is formed with a threaded member insertion hole into which a threaded member that is screwed into a threaded hole formed in the other of either the main frame or the corresponding side frame is inserted.

9. The headrest of claim 1, wherein the respective axes are inclined so as to approach each other on progression toward a lower side.

10. The headrest of claim 1, wherein the bracket includes a flange extending in an axial direction of the movable shaft.

* * * * *